United States Patent [19]

Liebler

[11] Patent Number: 4,941,616
[45] Date of Patent: Jul. 17, 1990

[54] LOW METERING RATE LIQUID DISPENSER

[76] Inventor: Gar D. Liebler, 2661 B S. Lapeer, Lake Orion, Mich. 48035

[21] Appl. No.: 352,042

[22] Filed: May 15, 1989

[51] Int. Cl.⁵ .............................................. B05B 7/30
[52] U.S. Cl. .................................... 239/310; 239/326; 222/187
[58] Field of Search ................... 239/35, 44, 310, 326, 239/398; 137/205.5; 222/187, 630

[56] References Cited

U.S. PATENT DOCUMENTS

| | | | |
|---|---|---|---|
| 2,966,312 | 12/1960 | Wilson, Jr. et al. | 239/318 |
| 3,060,956 | 10/1962 | Menzie | 239/310 |
| 3,123,303 | 3/1964 | Dearling | 239/57 |
| 3,194,444 | 7/1965 | Hubert . | |
| 3,799,442 | 3/1974 | Delmer | 239/145 |

Primary Examiner—Andres Kashnikow
Assistant Examiner—Karen B. Merritt
Attorney, Agent, or Firm—Warren D. Hill

[57] ABSTRACT

A liquid dispenser suitable for metering fertilizer concentrate into a lawn irrigation system has a canister coupled to a main stream water passage by a cotton wick which passes through an aperture between the canister and the passage. A relief hole permits pressure equalization between the canister and the passage. Very low feed rates are possible without danger of clogging by dirt.

3 Claims, 1 Drawing Sheet

U.S. Patent  Jul. 17, 1990  4,941,616
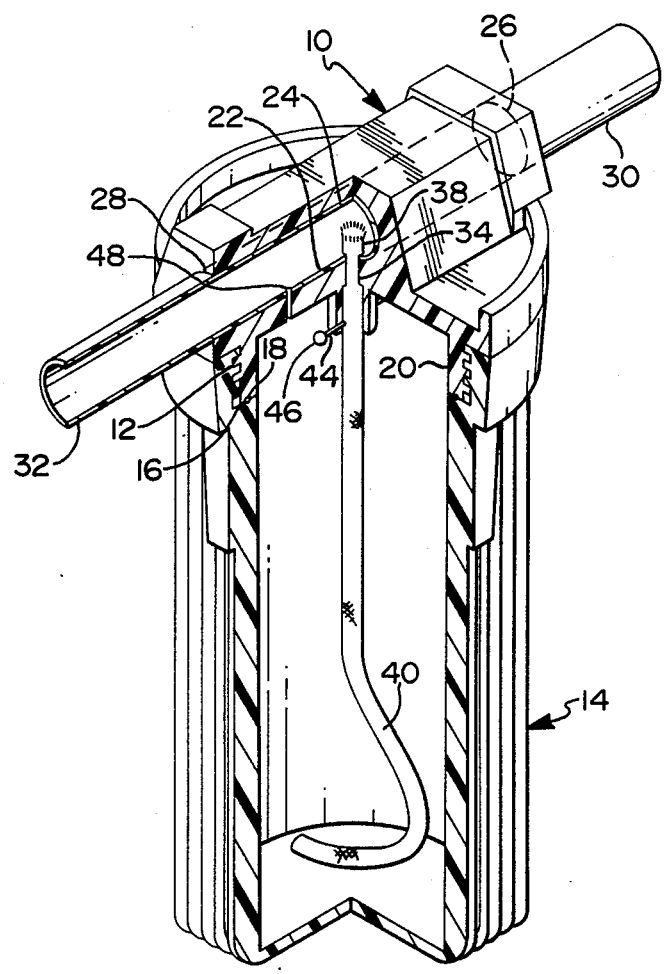

LOW METERING RATE LIQUID DISPENSER

FIELD OF THE INVENTION

This invention relates to a dispenser for slowly metering an additive from a reservoir into a stream of liquid such as water.

BACKGROUND OF THE INVENTION

Irrigation systems for watering lawns, gardens and the like provide an ideal medium for applying fertilizer or other products while irrigating. Lawns, in particular, require frequent application of fertilizer. Generally this entails purchasing bulky granular materials and distributing them with special spreading apparatus. Alternatively, one may subscribe to expensive services that dispense liquid fertilizer from tank trucks. With either of these approaches, the fertilizer is applied only a few times per season so that the nutrients are available to the lawn sporadically. Thus the use of a lawn sprinkler system to provide small amounts of fertilizer each time the sprinkler operates is highly desirable. By using a highly concentrated liquid fertilizer and metering it into the irrigation water very slowly, a moderate supply of fertilizer can last for many irrigation periods, thereby relieving the user of frequent replenishment chores while assuring the lawn or garden of regular feeding. The rate of application is not critical so that, within limits, dilution of the concentrate over its useful period is acceptable.

It is known to employ an aspirator type of meter to add a liquid agent to a liquid carrier, as typified in U.S. Pat. No. 3,060,956 to Menzie and U.S. Pat. No. 3,194,444 to Hubert. In such apparatus a small orifice is used to limit the exchange of liquid between a main stream and a reservoir. This is appropriate where the metering rate is sufficiently high to avoid using a very small orifice. A small orifice is subject to clogging by minute particles which may be present in either the main stream or in the additive. Accordingly the orifice controlled metering systems are limited, as a practical matter, to relatively high flow rates of the material from the reservoir and would not be very useful for the lawn fertilization purpose.

It is also known, as shown in U.S. Pat. No. 3,799,442 to Delmer to use a wick in drip irrigation devices where water pressure within the supply conduit forces water through a wick-filled aperture to water a plant. A key feature of that proposal is that the wick does not clog with salts or other matter. It is not apparent from Delmer or other known art that the non-clogging feature of the wick could profitably be employed in a fertilizer dispenser or the like.

SUMMARY OF THE INVENTION

It is therefore an object of the invention to provide a dispenser for metering minute amounts of liquid into a stream of water or other liquid stream.

The invention is carried out by a dispenser for metering an additive into a liquid medium at a low rate comprising: a vessel for holding an additive, the vessel having an opening, a cap removably secured to the vessel opening to provide a closure for the vessel, the cap having inlet and outlet means for coupling to a conduit and a flow passage connecting the inlet and outlet means, a first aperture in the cap between the flow passage and the vessel opening, a fibrous wick in the first aperture and extending into the flow passage and into the vessel whereby liquid additive is transported from the vessel to the flow passage through the wick, and a second aperture in the cap between the flow passage and the vessel opening of smaller size than the first aperture to allow pressure equalization between the flow passage and the vessel.

BRIEF DESCRIPTION OF THE DRAWING

The above and other advantages of the invention will become more apparent from the following description taken in conjunction with the accompanying drawing which is a partly broken away elevation of a liquid dispenser according to the invention.

DESCRIPTION OF THE PREFERRED EMBODIMENT

The ensuing description is directed to a dispensing apparatus which is specifically designed for lawn fertilizer application by attachment to a lawn sprinkler system. It is expected, however, that its usefulness extends to other applications where low rates of metering of one liquid into a stream of another liquid are required and especially where clog-free operation is important.

Referring to the drawing, a head or cap 10 molded of polyvinyl chloride (PVC) or the like is joined by threads 12 to a vessel or canister 14 which serves as a reservoir for a concentrated fertilizer or other additive. The canister 14 is a polymer material and is preferably transparent to allow visual checking of its contents. The canister 14 has an upper opening adjacent the threads 12 which is closed by the cap 10 when the two parts are threaded together so that the contents of the reservoir will be directly in contact with the lower surface of the cap when the reservoir is full. An internal shoulder 16 near the threads faces toward the cap and provides a seat for an O-ring 18.

The cap 10 includes a lower annular flange 20 which carries external threads 12 and which terminates in a lower end which traps the O-ring against the shoulder 16 of the canister 14 to seal the joint between the cap and canister. A web 22 across the top of the flange 20 forms the lower surface of cap 10 and completes the closure of the canister opening. A tubular flow passage 24 integrally molded with the top of the web 22 and including a portion of the web 22 has an inlet port 26 and an outlet port 28 each comprising a fitting for coupling to PVC pipes 30 and 32, respectively, which are part of an irrigation system and supply a stream of water through the passage 24.

The center of the web 22 has an aperture 34 connecting the flow passage 24 and the canister. A fibrous wick 36 comprised of cotton, for example, extends through the aperture 34 and fills the aperture. One end 38 of the wick 36 protrudes into the passage 24 so that water in the passage must flow around it and the other end 40 extends down into the canister 14. To assure a tight fit of the wick in the aperture a sealant may be applied at the lower surface of the web 22 around the wick 36. A pair of lugs 42 depend from the web 22 on either side of the aperture 34 and have holes 44 to receive a retaining pin 46 which passes through the wick to prevent its removal from the aperture 34. A second aperture or relief hole 48 smaller than the aperture 34 and downstream thereof extends through the web 22 between the passage 24 and the canister.

In operation, the canister is filled with a concentrated liquid fertilizer and the water for the sprinkler system is fed by the pipes 30, 32 and flows through the passage 24. The water flows around the end 38 of the wick 36 which effectively partially restricts the passage to cause a velocity increase in the water. By the venturi effect the pressure at the wick is reduced to draw the concentrate via the wick through the aperture 34 into the passage 24 where it mixes with the water. The second aperture 48 is located in a region which is free from the venturi effect and allows pressure equalization in the canister 14 and permits a flow of make-up water to enter the canister. Thus as the fertilizer concentrate is consumed the contents of the canister becomes diluted. When the concentrate is diluted so much that it is no longer effective to fertilizer the lawn, the canister is removed from the cap and the concentrate is replenished.

In practice, a dispenser of the type described above having one inch pipes 30, 32 supplying water at about 10 gallons per minute, a three pint canister 14, a wick 36 and aperture 34 each having a 3/16 inch diameter, and an aperture 48 of 1/16 inch diameter dispensed a test concentrate at a suitable rate for a total flow of 50,000 gallons of water. At that time the concentrate was deemed to be in need of replenishment. Of course the effective feeding would diminish as the dilution increases but remains useful even at the lesser rate until 50,000 gallon is reached which requires more than 80 hours. In practice, when irrigation occurs at daily intervals, this gives an extended period of use for each maintenance interval.

The embodiments of the invention in which an exclusive property or privilege is claimed are defined as follows:

1. A dispenser for metering an additive into a liquid medium at a low rate comprising:
    a vessel for holding an additive, the vessel having an opening,
    a cap removably secured to the vessel opening to provide a closure for the vessel,
    the cap having inlet and outlet means for coupling to a conduit and a flow passage connecting the inlet and outlet means,
    a first aperture in the cap between the flow passage and the vessel opening,
    a fibrous wick in the first aperture and extending into the flow passage and into the vessel, the portion of the wick in the vessel being exposed throughout its length to additive, whereby liquid additive is transported from the vessel to the flow passage through the wick, and
    a second aperture in the cap between the flow passage and the vessel opening of smaller size than the first aperture to allow pressure equalization between the flow passage and the vessel.

2. A dispenser for metering an additive into water at a low rate comprising:
    a vessel for holding an additive, the vessel having an opening,
    a cap removably secured to the vessel opening to provide a closure for the vessel,
    the cap having generally tubular opening providing a flow passage and an inlet and outlet means for coupling to a conduit,
    a first aperture in the cap between the flow passage and the vessel opening,
    a fibrous wick in the vessel and extending through the first aperture and into the flow passage to partially restrict the passage whereby low pressure is effected adjacent the wick during water flow through the passage to draw liquid additive through the wick from the vessel to the flow passage, the portion of the wick in the vessel being exposed throughout its length to additive, and
    a second aperture in the cap between the flow passage and the vessel opening of smaller size than the first aperture and spaced from the wick to allow pressure equalization between the flow passage and the vessel.

3. A dispenser for metering an additive into water at a low rate comprising:
    a metering head having a tubular flow passage, the passage including inlet and outlet means for connection to a water system for water flow through the passage,
    a canister for containing a liquid concentrate,
    threaded means for coupling the canister and the head,
    first and second apertures transverse to the passage and coupling the canister and the passage,
    wick means extending through the first aperture and having an end positioned in the flow passage and another end in the canister, the portion of the wick in the vessel being exposed throughout its length to the concentrate so that during water flow through the passage the concentrate is slowly aspirated via the wick means into the flow passage.

* * * * *